July 11, 1961 N. PIRONE 2,991,490
PORTABLE THREADING DIE SUPPORT AND PIPE SUPPORT STAND
Filed Jan. 6, 1959
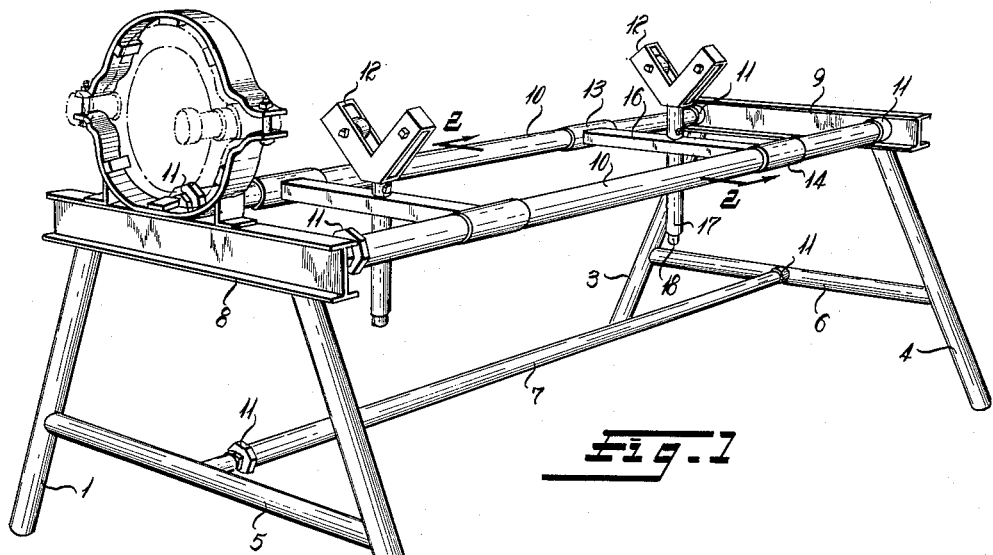
Fig. 1
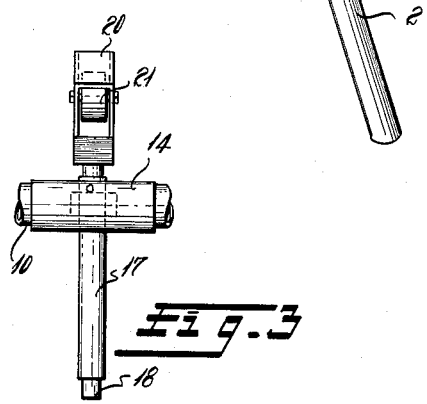
Fig. 3
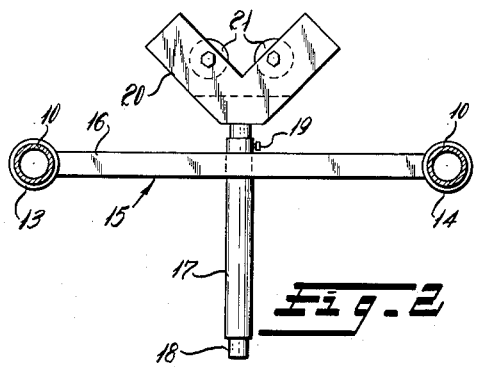
Fig. 2
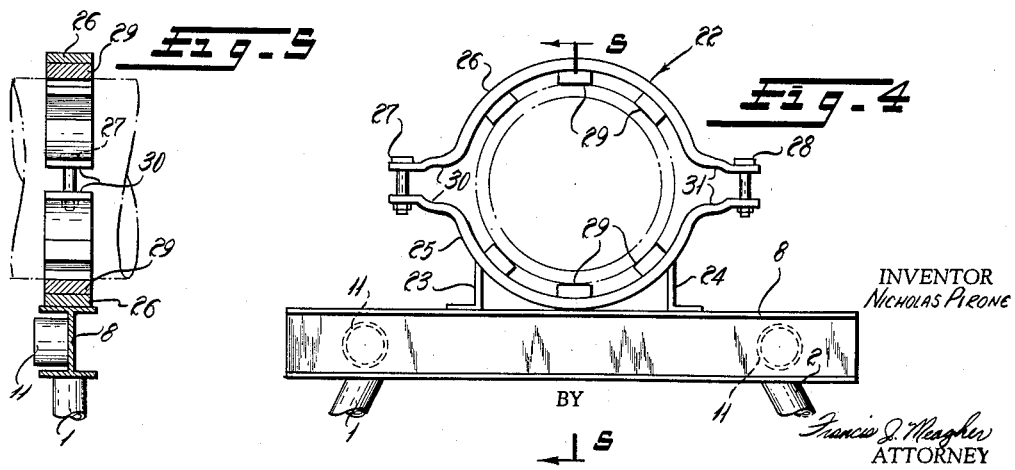
Fig. 5
Fig. 4
INVENTOR
NICHOLAS PIRONE
BY
Francis J. Meagher
ATTORNEY

United States Patent Office 2,991,490
Patented July 11, 1961

2,991,490
PORTABLE THREADING DIE SUPPORT AND PIPE SUPPORT STAND
Nicholas Pirone, 3812 Fenchurch Road, Baltimore, Md.
Filed Jan. 6, 1959, Ser. No. 785,215
1 Claim. (Cl. 10—89)

This invention pertains to an apparatus for supporting a portable pipe threading chuck and die. This relates to the use of a stand for supporting pipes incident to work thereon, namely, the operation of threading the end of the pipe.

In the past with the conventional pipe-threading-stand which usually has a means of securing the pipe in a horizontal plane at a convenient elevation, it has been necessary, when using the standard clamp-on threading device, to lift the heavy chuck and die assembly and fasten it to the end of the pipe in order to thread the pipe. This complete cycle of operation has been required for each section of pipe to be threaded.

An object of this invention is to provide a clamping ring on a stand in which the portable pipe threader may be secured in relation to the pipe to be threaded, the pipe being placed on supports provided for it on the stand. This eliminates the necessity to handle both pipe and pipe threader for each operation, thus lowering considerably the labor and time requirements in completing the job.

A further object of this invention is to provide a pipe threading stand which may be easily dismantled and may be stored in a minimum of space.

A further object is to provide a pipe threading stand with a high degree of portability.

A further object is to provide a pipe threading stand which is economical to operate and saving in time and labor.

A further object of this device is to increase the ease of power transfer for the operation of a portable geared pipe.

Another object of this invention is to provide a work stand for supporting pipes, with work supports easily adjustable both vertically and longitudinally, on which the supported pipe rides freely.

A further object is to provide the above advantages in a lightweight, easily portable, easily dismantlable, and low cost apparatus.

Other objects and advantages will be more apparent from the following description wherein reference is had to the accompanying drawings:

FIGURE 1 is an isometric view showing the complete pipe threading stand, pipe supports and pipe threader clamping ring;

FIGURE 2 is a segmented cross-sectional view taken along the lines 2—2 of FIGURE 1 showing the pipe supports attached to the longitudinal struts of the pipe bench;

FIGURE 3 is a side view of the pipe support shown in FIGURE 2;

FIGURE 4 is a fragmentary plan view of the end of the pipe threading bench having the pipe threader clamp;

FIGURE 5 is a side view of the pipe threader clamp shown in FIGURE 4.

In the embodiment of the invention which is shown in the illustrations, FIGURE 1 shows the general assembly which may include a stand having a pair of parallel opposed A-frame end sections having I-beam end supports 8 and 9 for strong vertical support for a pipe-threader-clamp and other attachments as desired and leg pairs 1 and 2, and 3 and 4 angularly set with respect to end supports 8 and 9 for stand stability with lateral braces 5 and 6 somewhat below their midpoints for maximum leg rigidity, the members of the end sections being secured together by welding or the like. Longitudinal struts 10 connect end supports 8 and 9 of the end sections and longitudinal strut 7 connects intermediate lateral braces 5 and 6, the three struts 7 and 10 forming an inverse triangular relationship for maximum rigidity with a design for maximum operator working convenience. Threaded sleeve joints 11 are provided for attachment of the end sections of the pipe stand.

The pipe support assemblies 12 are slidably attached to the longitudinal struts 10 by cooperating sleeves 13 and 14. As shown in FIGURE 2, the pipe support assembly 12 is comprised of the sleeves 13 and 14 attached to cross bar 16 which supports in the middle sleeve 17 in which pipe 18 is slidably mounted and held in place by set screw 19 and sleeve 17. Fastened to the top of pipe 18 is Y-shaped pipe support 20 which carries rotatable load bearing discs 21. Thus, the pipe supports are adjustable vertically and horizontally and provide an axially free-riding support for pipe.

FIGURE 4 shows the pipe-threader-clamp 22 mounted upon end support 8 and with reinforcing members 23 and 24; the clamp consists of two sections 25 and 26 fastened together by carriage bolts 27 and 28 and having a plurality of positioning stops 29 spaced evenly around the inner circumference and having extended openings 30 and 31 for proper receiving and seating of the pipe threader.

Operation

In normal use in a pipe threading operation, the portable clamp stand is erected near the work site and the proper pipe threader is then mounted in bracket 22 by placing the chuck portion of the threader in the opening between the bracket sections 25 and 26 and is secured by tightening carriage bolts 27 and 28. The pipe to be threaded is placed on work supports 12 and 13 as the end to be threaded is fed into the pipe threader chuck and the pipe threading operations carried out. Upon completion of the pipe threading operation, the pipe is then fed back out of the pipe threader and replaced by the next pipe to be threaded.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and fall within the scope of the invention or the limits of the appended claim.

Having thus described my invention, what I claim is:

A pipe threading stand for supporting pipe and clamping a pipe threader comprising a rectangular frame, said frame having a pair of parallel opposed A-frame end supports, each of said supports comprising a top brace of I-beam configuration, a pair of legs projecting downwardly and outwardly from the lower flange of said top brace, and an intermediate brace, three parallel longitudinal tubular struts connecting said end supports, two of said struts connecting said top braces at the webs thereof adjacent the respective legs projecting from said end supports, and the third strut connecting said intermediate braces, said struts forming an acute triangular relationship with one another, at least two horizontal bars each having a pair of tubular sleeves at either end thereof, said sleeves slidably mounted on said two top brace struts, each of said bars having a vertical opening centrally located therein, an adjustable upright Y-shaped pipe support mounted in each of said openings for vertical adjustment therein, means for securing each of said Y-shaped pipe supports in adjusted position, each of said Y-shaped supports having at least one guide roller in each arm of said Y rotatable about an axis parallel to the longitudinal axis of said tubular struts, and an annular pipe-thread-cutter clamping ring vertically and centrally mounted on one of said top braces, said clamping ring comprising a pair of semi-annular clamping members, means for connecting said members in clamped relation and L-shaped clamping ring supports on either side of said clamping ring rigidly securing said clamping ring to said top base, said clamping ring having positioning stops around the inner periphery thereof for centering said thread cutter into operating position when said cutter is secured by said clamp, and said Y-shaped supports being positioned vertically and horizontally with respect to said clamping ring so that the axis of the pipe being worked is coincident with the axis of the pipe cutter when said pipe cutter is mounted in said clamping ring, so that uniform thread may be cut on said pipe.

References Cited in the file of this patent

UNITED STATES PATENTS

| | | |
|---|---|---|
| 465,838 | Curtis | Dec. 29, 1891 |
| 695,480 | Nordstrom | Mar. 18, 1902 |
| 932,989 | LaVine | Aug. 31, 1909 |
| 1,437,552 | Reading | Dec. 5, 1922 |
| 2,678,453 | Rudolph | May 18, 1954 |
| 2,825,477 | Ross | Mar. 4, 1958 |